US008839121B2

(12) United States Patent
Bertolami et al.

(10) Patent No.: US 8,839,121 B2
(45) Date of Patent: Sep. 16, 2014

(54) SYSTEMS AND METHODS FOR UNIFYING COORDINATE SYSTEMS IN AUGMENTED REALITY APPLICATIONS

(76) Inventors: Joseph Bertolami, Seattle, WA (US); Samuel A. Mann, Bellevue, WA (US); Matthew L. Bronder, Bellevue, WA (US); Michael A. Dougherty, Issaquah, WA (US); Robert M. Craig, Bellevue, WA (US); Matthew W. Lee, Sammamish, WA (US)

( * ) Notice: Subject to any disclaimer, the term of this patent is extended or adjusted under 35 U.S.C. 154(b) by 945 days.

(21) Appl. No.: 12/436,420

(22) Filed: May 6, 2009

(65) Prior Publication Data

US 2010/0287485 A1  Nov. 11, 2010

(51) Int. Cl.
*G06F 3/048* (2013.01)
*G09G 5/00* (2006.01)
*G06F 7/38* (2006.01)
*G06F 3/01* (2006.01)

(52) U.S. Cl.
CPC ..................................... *G06F 3/011* (2013.01)
USPC ........................... 715/757; 345/633; 708/442

(58) Field of Classification Search
USPC ............................ 345/633; 715/757; 708/442
See application file for complete search history.

(56) References Cited

U.S. PATENT DOCUMENTS

| 7,120,875 | B2 * | 10/2006 | Daily et al. | 715/757 |
|---|---|---|---|---|
| 7,127,082 | B2 * | 10/2006 | Neely | 382/103 |
| 2004/0189675 | A1 * | 9/2004 | Pretlove et al. | 345/633 |
| 2006/0170652 | A1 * | 8/2006 | Bannai et al. | 345/156 |
| 2007/0038944 | A1 * | 2/2007 | Carignano et al. | 715/757 |
| 2007/0091125 | A1 * | 4/2007 | Takemoto et al. | 345/633 |
| 2007/0132662 | A1 * | 6/2007 | Morita | 345/8 |
| 2008/0031490 | A1 * | 2/2008 | Kobayashi | 382/101 |
| 2009/0081959 | A1 * | 3/2009 | Gyorfi et al. | 455/70 |
| 2009/0097710 | A1 * | 4/2009 | Sroka et al. | 382/103 |
| 2009/0271715 | A1 * | 10/2009 | Tumuluri | 715/757 |

* cited by examiner

*Primary Examiner* — Nicholas Ulrich
(74) *Attorney, Agent, or Firm* — Baker & Hostetler LLP

(57) ABSTRACT

Systems and methods for unifying coordinate systems in an augmented reality application or system are disclosed. User devices capture an image of a scene, and determine a location based on the scene image. The scene image may be compared to cartography data or images to determine the location. User devices may propose an origin and orientation or transformation data for a common coordinate system and exchange proposed coordinate system data to agree on a common coordinate system. User devices may also transmit location information to an augmented reality system that then determines an a common coordinate system and transmits coordinate system data such as transformation matrices to the user devices. Images presented to users may be adjusted based on user device locations relative to the coordinate system.

20 Claims, 8 Drawing Sheets

SYSTEMS AND METHODS FOR UNIFYING COORDINATE SYSTEMS IN AUGMENTED REALITY APPLICATIONS

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the patent and trademark office patent files or records, but otherwise reserves all copyright rights whatsoever. The following notice shall apply to this document: Copyright®2009, Microsoft Corp.

BACKGROUND

Augmented reality applications combine real world data and computer-generated data to create a user environment. Real world data may be collected using any suitable data collection means and processed and combined with computer-generated data to create the user environment. One of the most common approaches to augmented reality is the use of live video images captured with a camera that are processed and augmented with computer-generated graphics or other images. The resulting augmented video images are then presented to a user through a user interface, such as a video monitor. In many augmented reality applications, users interact with each other. Augmented reality can be used in video games, mapping, navigation, advertising, architecture visualization, and numerous other applications.

In order to operate and interact in an augmented reality system, a user may need location information for other users in the virtual environment created by the augmented reality application. More specifically, a user may have to determine another user's location relative to the location of that user in the virtual environment. The orientation and/or direction of movement of users may also be required to continue to maintain a common coordinate system that enables the execution of an augmented reality application. By determining and maintaining a common coordinate system, the augmented reality application can present a more realistic environment to users.

SUMMARY

Systems and methods for unifying coordinate systems in an augmented reality application or system are disclosed. A set or subset of users of an augmented reality application may use the described systems and methods for determining a common coordinate system on which interaction in a virtual environment may be based. The set or subset of users may be located in the same or separate physical areas, and the physical areas in which the set or subset of users are located may be mapped or unmapped.

A user device may determine an estimate for its own location using location technology such as GPS or triangulation. The user device may also capture one or more images of a scene, and then determine a precise location based on the estimated location and the scene images. This may be accomplished by comparing the scene images to previously captured images of the estimated location. The user device may access a database or other information store and select a set of images or image descriptors for comparison purposes based on the estimated location. The database may include detailed cartography and/or mapping information about the estimated location.

An origin and orientation for a unified coordinate system may be generated using a variety of means. In one embodiment, a user device may determine a proposed origin and orientation for a common coordinate system based on the determined precise location, and transmit this proposed origin and orientation to other user devices and/or to the augmented reality system or application and engage in a negotiation to arrive at a common coordinate system. Alternatively, precise location information may be received from user devices at the augmented reality application or system, which may then determine an origin and orientation and transmit that data to the user devices. In other embodiments, a unified coordinate system may be determined for the virtual space, but not the physical space, based on characteristics of the physical area in which user devices are operating. Other methods and means of determining an origin and orientation for a unified coordinate system are contemplated and described herein.

Images presented to users may be adjusted based on the user devices' location relative to the coordinate system. Such images may be adjusted by the user devices upon receiving data about the locations of elements represented by the images relative to the coordinate system from the augmented reality system or application. Alternatively, the augmented reality system or application may adjust images for each user device and transmit the appropriate images to each user device. Various other means and methods of determining a unified coordinate system and generating image based thereon will be disclosed.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

DETAILED DESCRIPTION OF ILLUSTRATIVE EMBODIMENTS

Systems and Methods for Unifying Coordinate Systems

Figure 1A:
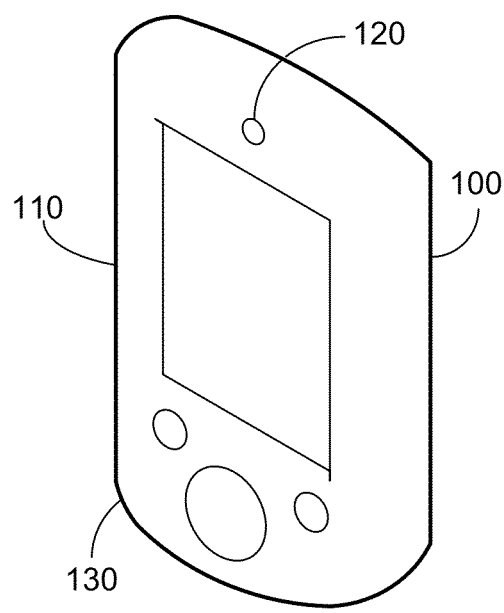
FIG. 1a is a graphical representation of one side of a device that may be used to implement parts of or a complete augmented reality application or system.
Figure 1B:
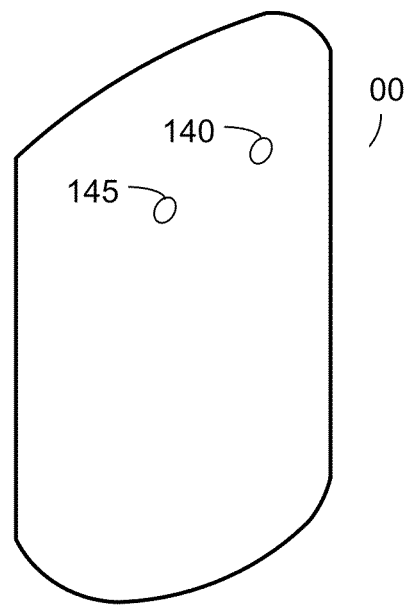
FIG. 1b is a graphical representation of another side of a device that may be used to implement parts of or a complete augmented reality application or system.

An augmented reality application may be implemented using systems and methods that incorporate or communicate with a variety of devices and configurations. FIGS. 1a and 1b illustrate an exemplary, non-limiting device 100 that may be used with or may be a component of an augmented reality application or system. Device 100 may be any device capable of implementing the systems and/or methods disclosed herein, such as a dedicated augmented reality user interface device, or any other device dedicated to use in an augmented reality application or system. Alternatively, device 100 may perform one or more aspects of an augmented reality system and work in conjunction with one or more other devices to implement a complete augmented reality system. Device 100 may also be integrated into one or more other devices that are capable of performing other activities beyond performing activities as part of an augmented reality application or system. Such devices may include a personal data assistant (PDA), a mobile telephone, a laptop or desktop computer, a mobile or stationary gaming system, a virtual reality helmet system, a stereoscopic eyewear, helmet or headgear, a camera, a video display, or any other device capable of implementing one or more parts of an augmented reality application or system and performing at least one other function. All such configurations and devices are contemplated as within the scope of the present disclosure.

FIG. 1a displays a user-facing side of device 100. On the user-facing side, device 100 may have a display 110 that may be any type of display capable of displaying video or still images. Display 110 may be a liquid crystal display (LCD), a cathode ray tube (CRT), a plasma display, a light-emitting diode (LED) display, an image projection device, or any other type of display or device capable of presenting an image visible to a user. Device 100 may also have more than one display. For example, device 100 may be a stereoscopic headgear with two displays, one for each eye, that create three-dimensional image effects when viewed. Multiple display configurations may be made up of multiple displays of the same type, or several different types of displays. Device 100 may be configured with various user controls 130, which may include buttons, dials, touch pads, keyboards, microphones, light or heat detection components, and any other type of user interface. All such configurations are contemplated as within the scope of the present disclosure.

Device 100 may be configured with user-facing detector 120 that may be any type of detection component capable of detecting the position of a user or a part of a user relative to device 100 or detector 120, or detecting a representation of user or a part of a user relative to device 100 or detector 120. Examples of such detectors include, but are not limited to, infrared detectors, thermal detectors, orientation detectors, and sound/acoustic detectors. Device 100 may have more than one user-facing camera or detection device. Multiple detection components may be used to detect a user, part of a user, or a representation of a user or part of a user in three-dimensional space. Any number and type of detection devices configured on the user-facing side of a device are contemplated as within the scope of the present disclosure.

FIG. 1b illustrates the scene-facing side of device 100. One or more detectors, such as scene-facing detectors 140 and 145, may be configured on the scene-facing side of device 100. Scene-facing detectors 140 and 145 may be any type of detector or camera that is capable of capturing an image or detecting information about a physical space within its range, including the types of detectors and camera described in regard to user-facing detector 120. By configuring device 100 with two or more detectors or cameras, device 100 may be enabled to detect three-dimensional space. Alternatively, device 100 may have a single scene-facing camera or detector, or no scene-facing camera or detector.

Device 100 may also be configured with computing and communications components not shown in FIGS. 1a and 1b. For example, device 100 may have global positioning system (GPS) components and/or software installed on it, and/or the capability to send and/or receive GPS data. Some of the various components that may be integrated into device 100 and/or an augmented reality application or system are described in more detail herein, including in the sections describing FIGS. 7 and 8.

While device 100 as shown in FIGS. 1a and 1b has a single unit housing all the described components, the components and devices used in an augmented reality application or system may be physically separate. For example, user-facing detectors and scene-facing detectors may be physically separate from one or more displays and each other and located in separate housings. Moreover, other components, such as processors, memory, storage devices, etc. may be located in one or more physically distinct devices or components. Such devices or components may communicate with each other using communications technologies known in the art, including wired and wireless communications technologies. All such implementations and configurations of an augmented reality application or system are contemplated as within the scope of the present disclosure.

Figure 2:
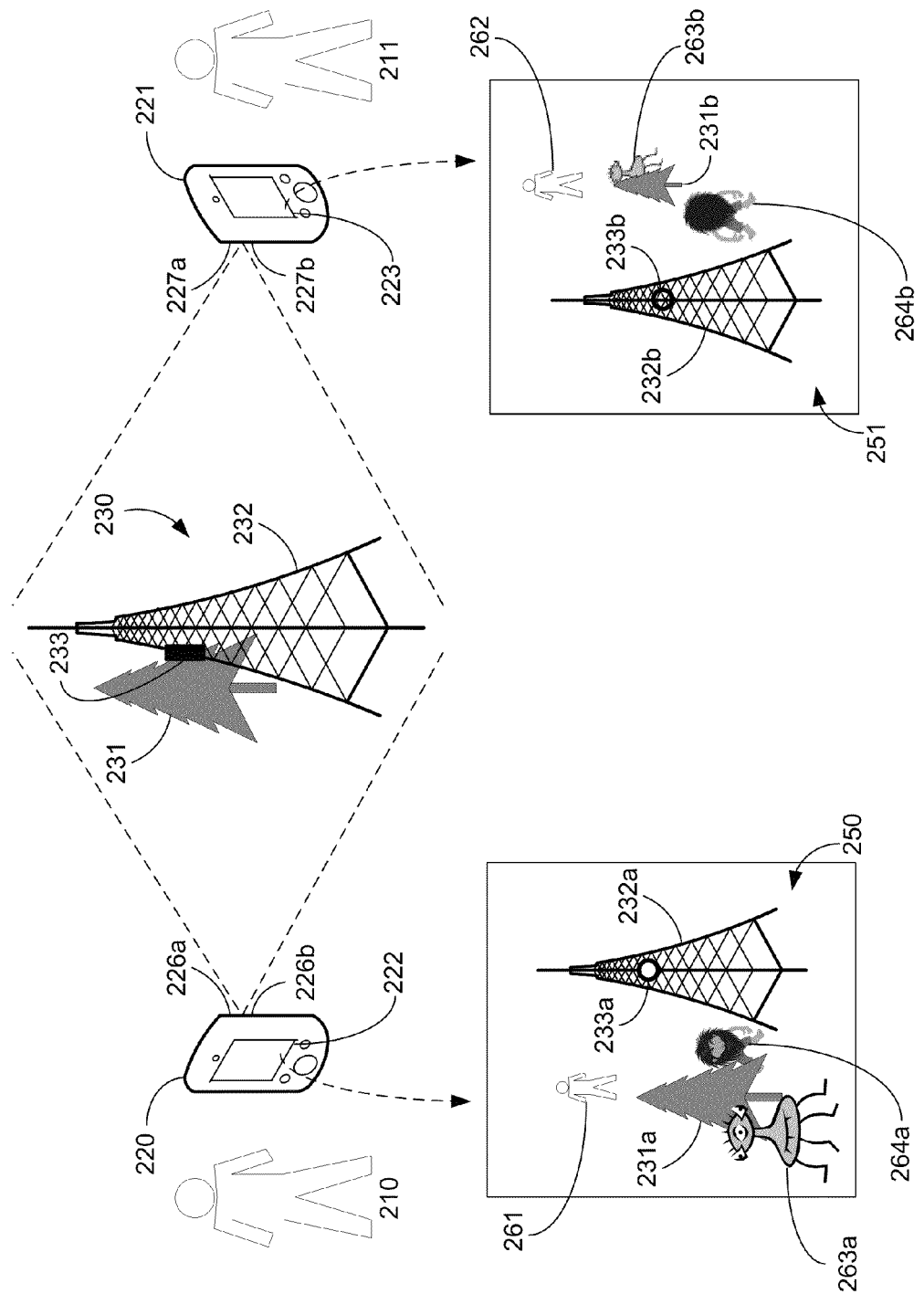
FIG. 2 is a graphical representation of augmented reality devices in use by users proximate to a scene.

FIG. 2 illustrates non-limiting, exemplary devices and users interacting with an augmented reality system or application. User 210 may be operating device 220, which may be executing an augmented reality application or may be a component of an augmented reality system. Device 220 may have a display 222, which may be any type of display or multiple displays as described herein. Device 220 may also have scene-facing detectors 226a and 226b, which may be any type of camera or detection device as described herein. Alternatively, device 220 may have zero, one, or more than two, scene-facing detectors. Device 220 may have any other components or parts not explicitly described in regard to FIG. 2, and all such embodiments are contemplated as within the scope of the present disclosure.

Device 220 and/or scene-facing detectors 226a and 226b may capture an image of physical area 230, or otherwise detect objects within physical area 230 and/or derive data from physical area 230. Physical area 230 may have within it landmarks that are detectable, including large landmarks such as tree 231 and tower 232, and/or relatively small and, in some embodiments, numerous landmarks that may be used for location determinations, such as distinctively textured portions of various scene objects or distinct and identifiable attributes of various scene objects. Examples of such detectable portions and/or attributes include the patterning of sections of bark on a tree, intricate metal-work on a tower, portions of the letters on a sign, cracks or other unique physical features of objects, etc. Physical area 230 may be a mapped physical space for which physical information is available. For example, cartography or other physical data may be available for the physical space containing physical area 230 from previous mapping activities. Such activities may have been performed by other users of an augmented reality system or by non-users of such a system. In another embodiment, physical area 230 may be in unmapped physical space for which no cartography or other physical data is available. In many embodiments, other users will not be visible, present, and/or detectable within or proximate to physical area 230. Alternatively, one or more other users, such as user 211, may be proximate to or within physical area 230 and may be detected by scene-facing detectors 226a and 226b.

If the physical space containing physical area 230 is unmapped, or if a new or additional mapping of a section of the physical space is desired, device 220, in conjunction with scene-facing detectors 226a and/or 226b, may be operated or otherwise instructed to perform a mapping of the physical space. After a physical space has been mapped by a device, the cartography and/or other physical space information produced may be stored locally on device 220, transmitted to other uses of an augmented reality system, and/or transmitted to a remote server. This physical space information may be later retrieved and referenced by the same and/or other users of an augmented reality system to create unified coordinate systems. Reusing such physical space information may be computationally less expensive than remapping a physical space each time a user encounters the physical space. It may also provide a stable unified coordinate system to multiple users more quickly that would otherwise be achievable through a remapping process.

Image 250 may be presented to user 210 on display 222, and may represent an image captured from the perspective of device 220 or user 210. Image 250 may include images of objects such as tower 232a and tree 231a that may be images captured by scene-facing detectors 226a and 226b, or may be images generated from data derived from physical area 230 using any method or means. Image 250 may also include augmented reality application or system generated images, such as characters 263a and 264a. Such images may be overlaid upon or composited with scene images, such as images captured by scene-facing detectors 226a and 226b. Image 250 may also include images of other users, such as user image 261. User image 261 may be an image of a user within physical area 230, or user image 261 may be an augmented reality application or system generated image of a user.

User 211 may be a user of an augmented reality application or system of which user 210 is also a user. User 210 and user 211 may be in the same physical area or may be in separate physical areas. User 211 may be operating device 221 which may be any type of device as described herein, and may have any components as described herein, including scene-facing detectors 227a and 227b and display 223. Device 221 and/or scene-facing detectors 227a and 227b may also capture an image of physical area 230, or otherwise detect objects within physical area 230 and/or derive data from physical area 230, from the perspective of device 221 or user 211.

Image 251 may be presented to user 211 on display 223. Image 251 may be presented to user 211 from the perspective of device 221 or user 211. Like image 250, image 251 may include images such as tower 232b and tree 231b that may be images captured by scene-facing detectors 227a and 227b, or that may be images generated from data derived from physical area 230 using any method or means. Image 251 may also include augmented reality application or system generated images, such as characters 263b and 264b. Such images may be overlaid upon or composited with scene images, such as images captured by scene-facing detectors 227a and 227b. Image 251 may also include images of other users, such as user image 262. User image 262 may be an image of a user within physical area 230, or user image 262 may be an augmented reality application or system generated image of a user.

Note that the images presented to users 210 and 211, while in one embodiment contain representations of the same objects and/or users, may be presented in different perspectives, such as the perspective of the device or the user of the device. This may be relatively trivial to implement when presenting an image captured of a scene, such as physical area 230, in a device operated by a user since the device capturing the image necessarily captures the image from the perspective of the device. However, when presenting augmented reality images, alone or composited with scene images, a determination may be need to be made as to the coordinates, locations, and/or positions of such augmented reality images in relation to the user and/or the scene with which such images are composited. This may be done so that the augmented reality images can be manipulated to appear more realistic and, in some embodiments, appear to interact naturally with the scene images with which they are composited.

For example, characters 263a/b and 264a/b may appear differently to users 210 and 211 respectively because of the users' location or orientation in the virtual space in which the users are operating in an augmented reality application or system. In one embodiment, as seen in image 250, character 263a may presented as an image of the front of the represented character in the foreground of image 250, in front of tree 231a when image 250 is presented on display 222 and viewed by user 210. Character 264a, on the other hand, is an image of the front of the represented character and is in the background, behind and partially obscured by tree 231a. This particular presentation of augmented reality images may be determined to be an accurate view of the augmented reality images from the perspective of user 210 in the virtual environment of the augmented reality application or system.

Image 251 may be an image of physical area 230 composited with augmented reality images. In image 251, because user 211 and/or device 221 are viewing physical area 230 from a different perspective, the positions of objects in image 251 may be different from the positions on the same objects in image 250. Thus, in image 251, while the character represented by character 264b may be the same character as the character represented by character 264a in image 250, the back of the character is displayed to user 211 by character 264b, and character 264b may be in the foreground. Likewise, while the character represented by character 263b may be the same character as the character represented by character 263a in image 250, the back of the character represented by character 263b may presented to user 211 and may be in the background and partially obscured by tree 231b. This particular presentation of augmented reality images may be determined to be an accurate view of the augmented reality images from the perspective of user 211 in the virtual environment of the augmented reality application or system.

Similarly, representations of users, such as user image 261 in image 250 and user image 262 in image 251 may be presented in a manner that makes them appear more realistic to the users viewing the images. In one embodiment, these are computer-generated images of users rather than actual images of users captured by scene-facing cameras. For instance, while user 210 may be too far geographically from user 211 to be visible to user 211, or the users may be unable to see each other due to objects in the way, user image 261 may be a representation of user 211 that is composited with a scene image captured by scene-facing detectors 226a and 226b. User image 261 may be presented in a way that reflects the distance between the users, for example as a small figure in the background of image 250. Similarly, user image 262 in image 251 may be presented in a similar manner to reflect the distance between the users.

In order to present more realistic computer-generated or supplemental images in an augmented reality application or system, especially if such images are composited with scene images and/or such images represent virtual figures or objects used by multiple users, a common coordinate system may be determined. A common coordinate system may be determined by detecting elements in a scene and determining an origin and orientation of the coordinate system based on the elements. When multiple users and/or devices are involved in an augmented reality application or system, the users and/or devices may use various methods and means to agree on common elements on which a coordinate system may be based.

In one embodiment, devices 220 and/or 221 may include location technology components, such as GPS components and/or software, and/or components that are configured to transmit and/or receive GPS data. Alternatively, devices 220 and/or 221 may include other location technology, such as the components configured to communicate with a mobile communications network and transmit and/or receive triangulation data. Any type of location technology that can be used to determine a device location, regardless of the precision of the technology, is contemplated, as are devices that have no location technology configured. In another embodiment, a user may provide information to a device indicating an estimated location. For example, user 210 may input a zip code, a street address, or other location information into device 220 that indicates an estimated location. Devices 220 and/or 221 may use any available location technology to determine an estimate of location. While such an estimated location may be used to determine a coordinate system, in some embodiments, this estimate may not be precise enough to determine the coordinate system and may be used instead to provide an estimate of the location of the device.

In one embodiment, having obtained an estimate of their respective locations using configured location technologies, device 220 and/or device 221 may detect physical area 230 which may include tower 232 and tree 231. In another embodiment, the devices may detect physical area 230 without first determining an estimated location. In some embodiments the images detected of physical area 230 may be detected by two or more detectors on each of devices 220 and 221, resulting in a three-dimensional image of physical area 230. Alternatively, the resulting images may be two-dimensional and may be captured by a single scene-facing detector. All such embodiments are contemplated as within the scope of the present disclosure.

The images collected by device 220 and/or device 221 may be analyzed using a variety of methods and means to determine a precise location of device 220 and/or device 221. Alternatively, groups of pixels, data representing groups of pixels, or other subsections of the images collected by device 220 and/or device 221 may be analyzed. For example, device 220 may analyze one or more images of physical area 230 as captured by scene-facing detectors 226a and/or 226b and determine that landmarks such as tree 231, tower 232, cracks on tower 232, and/or a letter on a sign proximate to tree 231 are particular landmarks within the estimated location determined by location technology configured on device 220. Alternatively, device 220 may extract one or more portions of one or more images collected of scene 220 to determine if one or more landmarks match landmark descriptors, landmark templates, or images of landmarks. Device 220 may also determine an orientation for itself and/or user 210. By analyzing the captured image(s), or by using other means, device 220 may determine that user 210 and/or device 220 is a specific distance from tower 232 and in a specific orientation. For example, device 220 may determine that device 220 is located 1500 meters southwest of tower 232, facing northeast. Likewise, device 221 may determine that device 221 is located 1000 meters northwest of tower 232, facing southeast. Further details are provided herein on methods and means of analyzing images to determine precise locations.

In one alternative, tags or other particular objects or structures within a scene may be detected by a device. For example, tag 233 may be affixed to tower 232. Device 220 and/or device 221 may detect tag 233 using scene-facing detectors. The front of tag 233 can be seen as tag 233a in image 250, while the back of tag 233 can be seen as tag 233b in image 251. Tag 233 may emit a detectable form of radiation, may have specific markings or a specific shape, or may be otherwise configured such that it represents a specific location that can be determined when the tag is detected by a detector configured on a device that is interacting with an augmented reality system or application. Orientation and distance from the tag may also be determined by a device. In another alternative embodiment, comprehensive maps may be used to determine location based on landmarks or other detectable features of a physical space. Such features may comprise small, distinctively textured, portions of various objects and may be used for precise location determination, rather than, or in conjunction with, tags or other objects dedicated to location determination. All such embodiments are contemplated as within the scope of the present disclosure.

If mapping information for physical area 230 and/or the physical space in which it exists has been previously gathered, such information may be loaded onto device 220. With previously generated cartography or location information associated with physical area 230 and/or its associated physical space, a local coordinate system may have already been established by prior users during the initial mapping. However, a coordinate system transformation may be performed at some point after the initial mapping once more complete information is available. For example, when mapping an unknown area, a very small portion of that area may be initially observed or captured. A relative context through a chosen coordinate system based on the small area observed may have been established in order for the mapping process to proceed, for example, defining where each landmark is located relative to all other landmarks and the detector used in the mapping. Once mapping information becomes available for the larger region within which the small area is located, it may be desirable to remap everything within the small area based on a coordinate system associated with the larger region. For example, it may be desirable to remap the space in an automated fashion based on the distribution density of observed features, such as centering the origin within the greatest mass of distinct landmarks, as might be done in a map of a town. Alternatively, it may be desirable to remap the space using a context-sensitive approach based on features in the map actually recognized by the device or server, such as centering the origin on a recognized game board or a landmark.

If multiple users are located in the different physical areas, and no mapping or physical area data is available for the physical areas, each user and/or user device may map their respective physical areas independently and employ their own determined coordinate system that may be defined early in the mapping process. Then, the users and/or devices may engage in a negotiation process to arrive at a unified system. The negotiation may determine a unified coordinate system unification based on fiducial markers, recognized features, compared landscape topographies, and/or arbitrarily selected local origins.

If no mapping or physical area data is available for a space, and multiple users are located in the same area, it may be unlikely that individual users will initially observe enough common landmarks from their individual perspectives to obtain a confident estimate of their true locations relative to one another. Coarse location estimation may be able to provide user positions but may not be able to provide orientations and, if the area is unmapped, there may be no known features with recorded positions that can be used for precise location determination. In such cases, until enough common landmarks are detected, each user is operating in what amounts to completely different physical areas, each with the user's own local coordinate system. Therefore, the users and/or devices may engage in a negotiation process to arrive at a unified system, as described above.

When enough common landmarks or descriptive features in a shared space are detected and recognized as common, in one embodiment through transmission to other users in the group that are present in the space, a unified coordinate system may be determined in one of several ways. In one embodiment, the negotiated coordinate system established prior to detecting a sufficient number of common landmarks or features may remain in use. If the coordinate system is left unaltered, mapping may proceed independently on each device and the shared physical space may be treated as though it was physically separate space by each device. This may be the simplest approach because no updates are required and no renegotiation must be performed to maintain the unified coordinate system. However, the virtual positions of each user/device in the unified coordinate system may be inconsistent with the physical positions of the users in the shared space. Also, if the physical space is viewed by one user viewing the displays of two or more devices networked together in an augmented reality session, the augmentation constructs that are blended with the captured images on each display may not match one another.

Alternatively, the negotiated coordinate system in use prior to detecting a sufficient number of common landmarks or features may be updated or replaced by a coordinate system determined through a process of complete cartography unification. A set of maps that has been identified as physically congruent may be fully merged into a single unified map shared among all users and/or devices. All local map coordinates may be recalculated so that they represent coordinates in a common shared coordinate system. Once a common shared coordinate system is determined, some recorded landmark positions and/or orientations may be modified, or the landmarks themselves may be eliminated. Landmark templates that may be referenced for position tracking may be merged and/or updated. Other alterations may be performed, such as changes to the positions, orientations, and scales of augmentation objects in order to impose consistency on them. Once the maps have been fully unified, it may then be possible for all users in the shared space to engage in a process of collaborative map growth, where the users may contribute new observations and measurements of landmarks to a shared repository and dedicate their processing to refinement of the common map. In this embodiment, because the map is now identical between all participants, the coordinate system is inherently unified and no further negotiation is required.

In another embodiment, maps or other physical space information determined by individual users and/or devices associated with a common physical space may be maintained as a set of sub-maps connected to one another. Since the growth of a map beyond a certain size may become prohibitive due to processing expense, it may be useful to separately maintain individual maps of smaller areas that are identified as physically congruent, but establish connectivity information on their relative locations in the larger space. The reorientation of sub-maps for proximity may require changes to augmentation data, but unlike complete cartography unification it will not involve the relative modification of the cartography information itself. Rather than negotiate a unified coordinate system, unification dictated by sub-map connectivity (itself derived from observations of common landmarks across different sub-maps for relative locations) may be used. The newly established coordinate system unification may need to be updated and/or renegotiated with any devices not present in the bounds of the physical space defined by the set of sub-maps, for example for users that truly are in different physical regions.

The use of sub-maps in a shared physical space does not preclude the use of collaboration in map expansion, so long as the sub-map information is transmitted among the users in the shared space. Instead of all proximate users working jointly on a common map, collaboration here may shift such that each user contributes to the growth of the sub-map currently occupied. The progenitor of a given sup-map may be irrelevant. When a user migrates from one sub-map to another, the user device may be configured to recover to the new sub-map, cease all cartography work on the sub-map associated with the area that has been left, and begin contributing to the new sub-map associated with the area entered.

If a set or subset of users is sharing the same physical space and that physical space is already mapped, cartography or other physical space data may either be retrieved by one or more users from a common augmented reality system server and/or disseminated among the user devices if such information is stored in one more user devices in local storage. If multiple users have disparate maps of the same location, one of the approaches described herein for determining a coordinate system involving independent maps covering a common physical area may be used. If multiple users had previously transmitted independent maps of a shared space to a server, such a server may be configured to undertake a process of complete map unification to produce a single coherent map of a shared space. In some cases, complete cartography information may be unavailable, but coarse location information may still be maintained through a database of feature descriptors and their positions. A device may use coarse positioning methods, such as GPS, to index into a relevant set of descriptors in the database, compare the descriptors to prominent features extracted from captured scene images, and use any matches to calculate coarse device orientations from the feature locations recorded in the database. Such coarse positions and orientations can then be used as the basis for a less refined unification of coordinate systems between the devices. All such embodiments are contemplated as within the scope of the present disclosure.

Once one or more devices interacting with an augmented reality system or application determines a precise location for itself, it may establish a common coordinate system with other devices interacting with the augmented reality system or application. In one embodiment, device 220 may transmit a proposed coordinate system origin and/or orientation to device 221. For example, device 220 may determine a specific location for tower 232, and may transmit a message to device 221 proposing that the location of tower 232 serve as a coordinate system origin with normal cardinal orientation. Device 221 may then accept or reject the proposed coordinate system. Alternatively, device 220 and 221 may negotiate or enter into a handshake process to determine a coordinate system origin and orientation. In some embodiments, the common coordinate system may be shared in the virtual space, but not the physical space. For example, one user may be located in a living room with an open space on the floor and another user may be located in an office with no floor space but a large cleared table. During the negotiation process the users could share their respective room layouts with one another, determine that each room layout has a flat empty physical plane of approximately the same size, determine the area of the plane to be sufficient for the augmented reality application, and settle upon an origin for the first user at the center of the floor and an origin for the second user at the center of the table surface. Methods and means of determining an origin and/or orientation will be described in further detail herein.

Once a common coordinate system is determined, devices interacting with an augmented reality system or application can then track the locations of characters, objects, and users, both actual and virtual, within the coordinate system. Interacting devices may also exchange information between one another regarding location data for objects detectable by the devices. For example, if tree 231 is within the field of detection of a user device 220, but not within the field of detection of user device 221, and is of interest to user device 221, user device 220 may transmit coordinates, transformation matrices, or other location data about tree 231 to user device 221. The devices may also periodically update the coordinate system or resynchronize coordinate systems, using the same or different physical landmarks, features, tags, etc. that were used to initially establish the coordinate system. For example, at periodic intervals, a device may analyze scene images to determine specific landmarks, objects, etc. and communicate with other devices to adjust the common coordinate system as needed.

Resynchronization may also be required when the available cartography or physical area data upon which a common coordinate system was established has undergone a transformation, for example due to obtaining larger region information. Thus, the origin and orientation of a common coordinate system may need to be renegotiated. Updated cartography or physical area data may be retrieved, or previous cartography or physical area data may be restored by taking into account a transformation previously applied. Resynchronization may also need to be performed if cartography or physical area data is further expanded at a later time, thereby making it desirable to update the coordinate system.

Figure 3:
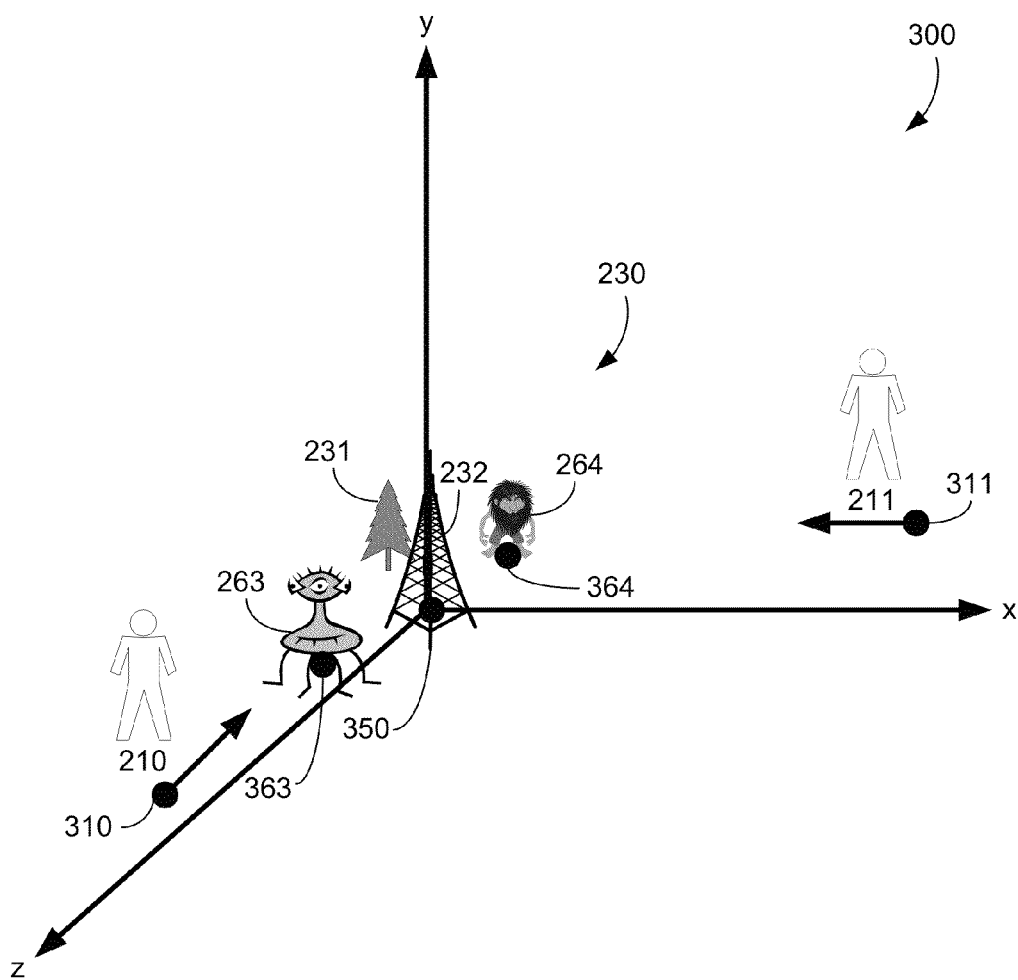
FIG. 3 is a graphical representation of physical and virtual elements as located on a common coordinate system that may be in use by an augmented reality application or system.

The use of a common coordinate system may assist in presenting realistic computer-generated or derived images to a user of an augmented reality system or application. FIG. 3 illustrates the virtual characters, users, objects and physical area 230 shown in FIG. 2 as located on common coordinate system 300 in three dimensions. In one embodiment, devices 220 and 221, users 210 and 211 operating devices 220 and 221, or an augmented reality system or application, determine that the base of tower 232, at origin point 350, will serve as the origin of a coordinate system used by both devices for interaction with an augmented reality application or system. The orientation of coordinate system 300 may also be determined by the devices or system. For example, device 220 may determine that user 210 is at point 310 facing physical area 230, and specifically tower 232. The device(s) or system may then determine that the position of user 210 relative to axes of the coordinate system, such as axes x, y, and z illustrated as part of coordinate system 300.

Alternatively, users 210 and 211 operating devices 220 and 221 may each negotiate to arrive at a reasonable common coordinate system for their own local coordinate systems in the context of shared information about one another's physical landscapes or agreed upon descriptors, which thereby provides the unification sought after. For example, as set forth above, one user may be located in a living room with an open space on the floor and another user may be located in an office with no floor space but a large cleared table. During the negotiation process the users could share their respective room layouts with one another, determine that each room layout has a flat empty physical plane of approximately the same size, determine the area of the plane to be sufficient for the augmented reality application, and settle upon an origin for the first user at the center of the floor and an origin for the second user at the center of the table surface. All other methods and means of determining a common coordinate system may be used, and are contemplated as within the scope of the present disclosure.

Once the origin, axes, and/or orientation of coordinate system 300 are determined, the locations of other objects in the virtual and/or actual space relative to the coordinate system may be determined. In one embodiment, a second user, such as user 211, is physically proximate to the landmark or feature used to determine the origin of coordinate system 300, and therefore is located in coordinate system 300 at point 311 that corresponds to the physical point in actual space that user 211 occupies. Alternatively, user 211 may be physically located at a point remote to the origin of coordinate system 300, but may have a virtual presence in the augmented reality environment that is proximate to the origin of coordinate system 300. For example, user 211 may be a different city than user 210. Users 210 and 211 (and/or their devices and/or the augmented reality application or system) may agree that point 350 will be the origin for coordinate system 300 to be used in the augmented reality system or application. User 211 may wish to be located proximate to other users, objects or areas in the virtual environment, and therefore may be virtually located at point 311. Thus, in the virtual environment, a computer-generated or derived image of user 211 may be located at point 311 from the perspective of user 210 on display 222. Note that in some embodiments, the virtual objects shown in FIG. 3 may be from user 210's perspective. User 211 as seen in FIG. 3 may be a virtual user image presented to user 210. Likewise, user 210 may be a virtual image presented to user 211 located at point 310 in the common coordinate system used for virtual objects.

Similarly, other objects may be located appropriately according to coordinate system 300. For example, character 263 will be located at a point 363 in coordinate system 300. Because the locations of users and physical objects relative to the coordinate system are known by the augmented reality system, application, and/or devices, character 263 can be placed at the correct location and orientation in the virtual environment. For example, as presented to user 210, character 263 may be shown in front of tree 231 and tower 232, facing user 210. However, the image of character 263 presented to user 211 may be adjusted to account for the location of user 211. For example, as presented to user 211, the image of character 263 may be shown behind tower 232 and tree 231, facing away from user 211. Similar adjustments may be performed to images of character 264 at point 364 that may be presented to particular users or devices based on the locations of the users or devices and character 264 relative to coordinate system 300. Alternatively, varying images may be presented to different users based on the location of the users and/or the characters or objects represented by the images relative to a coordinate system. All such embodiments are contemplated as within the scope of the present disclosure.

Figure 4:
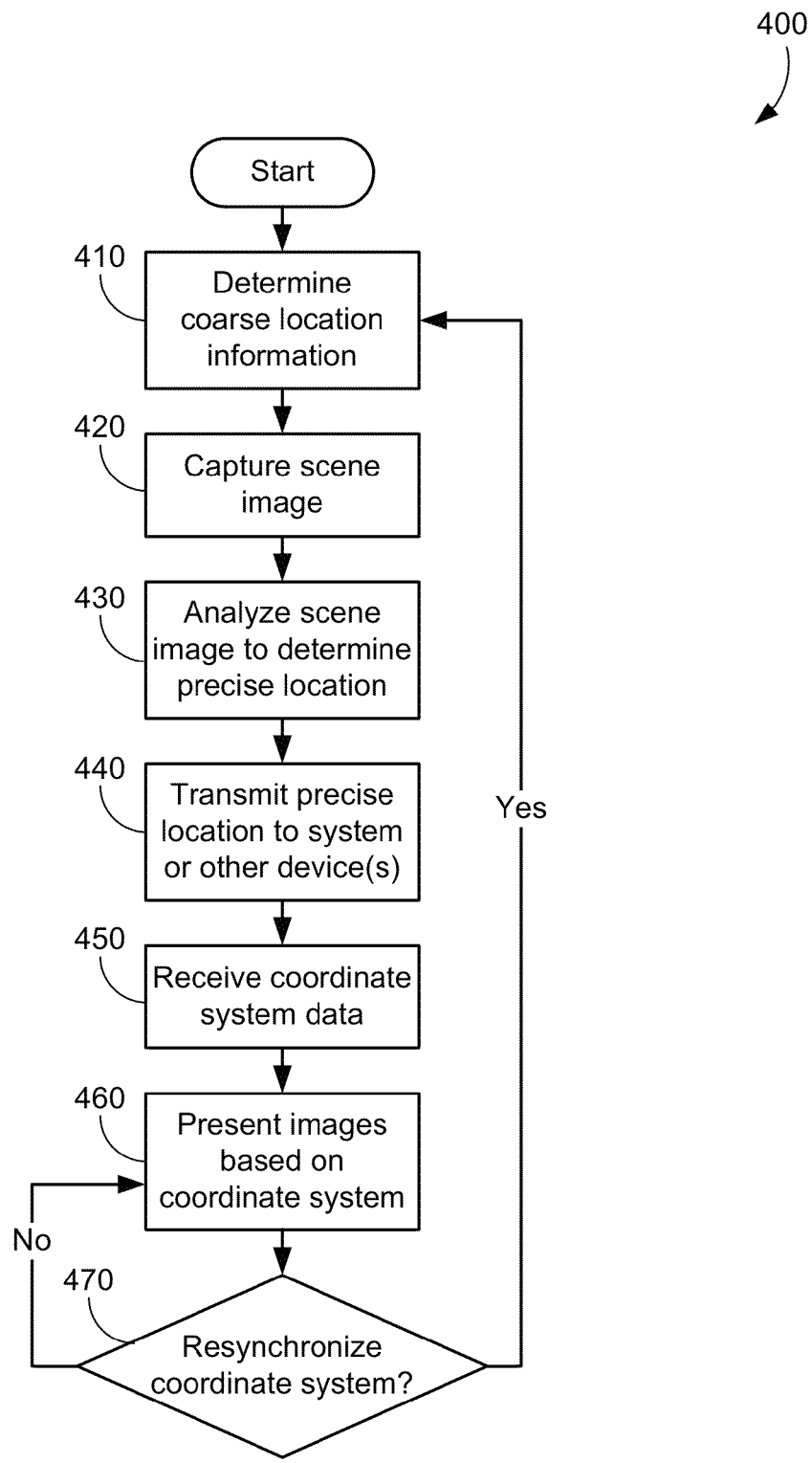
FIG. 4 is a non-limiting exemplary diagram of a method of unifying coordinate systems in an augmented reality application or system.

FIG. 4 illustrates a non-limiting exemplary method 400 of implementing unification of coordinate systems in a device that interacts with an augmented reality application or system. At block 410, the device determines coarse location information. This may be any location information that may be used to analyze an image or other detected data to determine a precise location as described in more detail below. Coarse location information may be determined in any of a variety of ways, including using GPS coordinates obtained or determined for the device. Alternatively, the device may use triangulation, or may obtain triangulation information from a wireless communications network. In another embodiment, a user may provide location information to the device. For example, the user may provide a street address, a zip code, a landmark identifier, or other location information to the device. In yet another embodiment, the device may obtain coarse location information itself, for example by determining the area of service for its own telephone number area code and determining whether the device is in its own area of service. In another embodiment, the device may communicate with a wireless network and request location information from the network. Any methods or means of determining a coarse location for a device are contemplated as within the scope of the present disclosure.

At block 420, one or more scene images are captured. This may be any image or images of a scene or any collection of data from a scene, area, space, or other physical environment. In one embodiment, after determining at block 410 that a device is in a particular area, a user may operate a device equipped with a camera or other detector to capture an image of the area that may contain one or more known landmarks or features. Such features or landmarks that may be used for precise location determination may be composed of many detectable but relatively small and distinctively textured portions of various objects scattered throughout a detected scene. For example, in an image captured on a street in New York City, example landmarks that may be extracted include the letter 'G' taken from a street sign, the door handle of a building, and/or a crack in the sidewalk. The relative motions of these landmarks in response to camera movement may be measured and analyzed to provide the precise position of a device.

In another embodiment, the user may operate the device to capture an image of a particular landmark (for example, the Empire State Building.) Alternatively, a user may operate a device to capture an image of a tag or other feature that is designed specifically to facilitate determining location information. Such a tag may emit a form of radiation specially detectable by a properly configured device, or may be a specific shape, size, design, pattern, and/or color that is recognized by augmented reality software or associated software for the purposes of determining locations.

This capture may be performed at the request of an augmented reality system or application, or other software working in conjunction with such a system. For example, once a device determines coarse location information (for example, New York City), the device may request through its user interface that the user obtain an image of a particular landmark (for example, the Empire State Building.) The scene image(s) captured may be three-dimensional and captured with two or more detectors communicatively connected to a device operated by a user. Alternatively, the scene image captured may be two-dimensional, and obtained using a single detector or camera. In another alternative, more than one two-dimensional images are captured, using one or more detectors or cameras, and processed to extract three-dimensional data. All types of images and all methods and means of capturing images and/or requesting image capture are contemplated as within the scope of the present disclosure.

At block 430, the captured scene image is analyzed to determine a precise location. In one embodiment, one or more portions or subsets of the captured scene image, such as particular groups of pixels or data representing groups of pixels, may be analyzed. Any type of analysis may be employed that can facilitate determining a location. In one embodiment, the coarse location information is used to reduce a set of known features and landmarks to a subset containing only features and landmarks within the area of the coarse location. For example, once coarse location information is determined to be a particular city (for example, New York City), a database or other information repository that contains images, specifications, and/or any other data specific to the particular city that may be used to match shapes and/or images may be accessed. The image captured at block 420 may then be compared to the area data and a match may be obtained. Area data may include templates of landmarks that may be compared to collected images or portions of collected images. Manipulation as necessary to adjust the image and/or the area data to determine if there is a match may be performed. For example, images of multiple small features, such as letters in signs, or single large features such as the Empire State Building, may be manipulated to determine if the image captured matches the shape of the known features. Any method or means of identifying features, landmarks, or other elements of an image, and any method or means of comparing features, landmarks, or other elements in an image to known features, landmarks, or elements, is contemplated as within the scope of the present disclosure.

Once landmarks, features, or other elements are matched to mapping information known about a scene or area, an orientation and distance from the identified landmarks, features, or other elements may be determined in order to derive a precise location. This may be accomplished by analyzing the captured image(s) and calculating the distance from the identified elements and the particular angle of view or orientation towards the elements by comparing the captured image(s) to images taken at a known distance or orientation to the elements or associated data. The location of the device that captured the image may be determined in three-dimensional space or two-dimensional space. Note that in most embodiments, more than one element may be analyzed and compared to known mapping information such as feature templates or previously captured images. However, it is also contemplated that a single landmark, feature, or element may be used for location determination. Means and methods of performing these calculations may vary depending on whether the captured image is a three-dimensional image or group of images, or a two-dimensional image or group of images. All such means and methods are contemplated as within the scope of the present disclosure.

At block 440, the determined precise location information may be transmitted to another device or devices. Additional information may also be transmitted, such as cartography information about the physical environment or information on the specific mapping data that matched elements in one or more scene images. These recipients of this information may be other augmented reality components operated by other users of an augmented reality system or application, and/or one or more servers or other computers that are part of or interact with an augmented reality system or application but are not user devices. In one embodiment, a designated user device is configured to determine a coordinate system for all users in an augmented reality system or application, and precise location information is transmitted to that device. In another embodiment, a server is configured to receive precise location information from all the user devices in a particular augmented reality system or application and determine a common coordinate system. Any particular device or group of devices may be designated for common coordinate system determinations, and all such embodiments are contemplated.

At block 450, coordinate system data is received on a user device. This may include the origin of the coordinate system and the relative location of the user device and/or information that will enable a user device to transform its local coordinate system to the unified coordinate system. For example, a server dedicated to coordinating users in an augmented reality system may determine that a particular local point and orientation are the origin of a coordinate system (for example, the bottom northwest corner of the Empire State Building.) This information may then be transmitted to a user device. Alternatively, or in conjunction, spatial transformation data or instructions may be transmitted to a user device, such as a local-to-unified-space transformation matrix that the user device can multiply with its determined local position to obtain the position of the user device in a shared virtual space. Such transform information can be used by a user device to adjust how it constructs/displays its augmentation data and manages real and augmented data interaction. Information may be provided to a user device in any form, including matrices, software instructions, and/or Cartesian coordinates (for example, the user device is at point <3, 5, 7> and orientation <0, 0, 1> relative to the origin.) Any other type of coordinates, form of transform data, or other location information relative to an origin may be used. The location information may also be expressed in any type of units. An orientation may also be received by the user device, which may be provided in any useful manner, including cardinal orientation, an orientation matrix, or any other means of conveying an orientation. All such means and methods are contemplated as within the scope of the present disclosure.

At block 460, the user device may present images on a display based on the coordinate system. In one embodiment, a user device may have complete image information for an element stored in memory or otherwise accessible, for example, for a virtual character such as characters 263 and 264. The user device may receive element location and orientation information from another device interacting with an augmented reality system or application, and, using the now known common coordinate system, manipulate the stored element image so that is appears to be located at the element's virtual location and in the proper orientation to a user. Alternatively, a device may receive images of an element from another device and manipulate them according to the elements relative location in the common coordinate system. In yet another embodiment, no manipulation may be performed by a user device, and the image may be received from another device appropriately altered to reflect how the element should appear to a user located at the user's location.

In some embodiments, information may also be sent from a user device to other devices regarding location data for objects detectable to the sending user device. For example, if an object within the field of detection of a first user device is of interest to a second user device, the first user device may transmit coordinates, transformation matrices, or other location data about the object of interest to the second user device. Any other location information relating to one or more objects detectable by a device may be transmitted to other devices, and all such embodiments are contemplated as within the scope of the present disclosure.

In one embodiment, a user device or a system device alters an image of a virtual element so that is appears to interact with the physical environment seen by the user. For example, a device may determine that the location on the coordinate system of a virtual element is behind the location of a physical element on the coordinate system. Therefore, the image presented to the user of the virtual element may be altered to reflect the location of the element by cropping or otherwise changing the image so that it appears behind the physical element. This is illustrated in FIG. 2, where, in image 250, character 264a is partially obscured by physical element tree 231a. Any other alterations or manipulations of an image due to its location on a coordinate system are contemplated as within the scope of the present disclosure.

At block 470, a decision is made as to whether a resynchronization of the determined coordinate system is needed. User devices and/or an augmented reality system or application may be configured to periodically perform the actions described in method 400 in order to maintain a synchronized coordinate system among user devices. Alternatively, the system or user devices may be configured to initiate a synchronization of the coordinate system after detecting a trigger. Such a trigger may indicate that conflicting information has been detected regarding element locations, or that other problems have been detected regarding image presentation or any other aspect of an augmented reality system or application. Any method or means of initiating or participating in a resynchronization of a coordinate system is contemplated. If resynchronization is to be performed, the method returns to block 410. Alternatively, the method may return to a different block if the determinations made in other blocks are not needed to resynchronize the coordinate system. For example, in some embodiments, determining coarse and precise location information may not be required to resynchronize a coordinate system. Also, a determination regarding whether or not resynchronization is to be performed may not be made each time an image is presented, but may instead be determined only on detection of a trigger or at periodic intervals. If no resynchronization is to be performed, the method returns to block 460 to further present images to a user.

Figure 5:
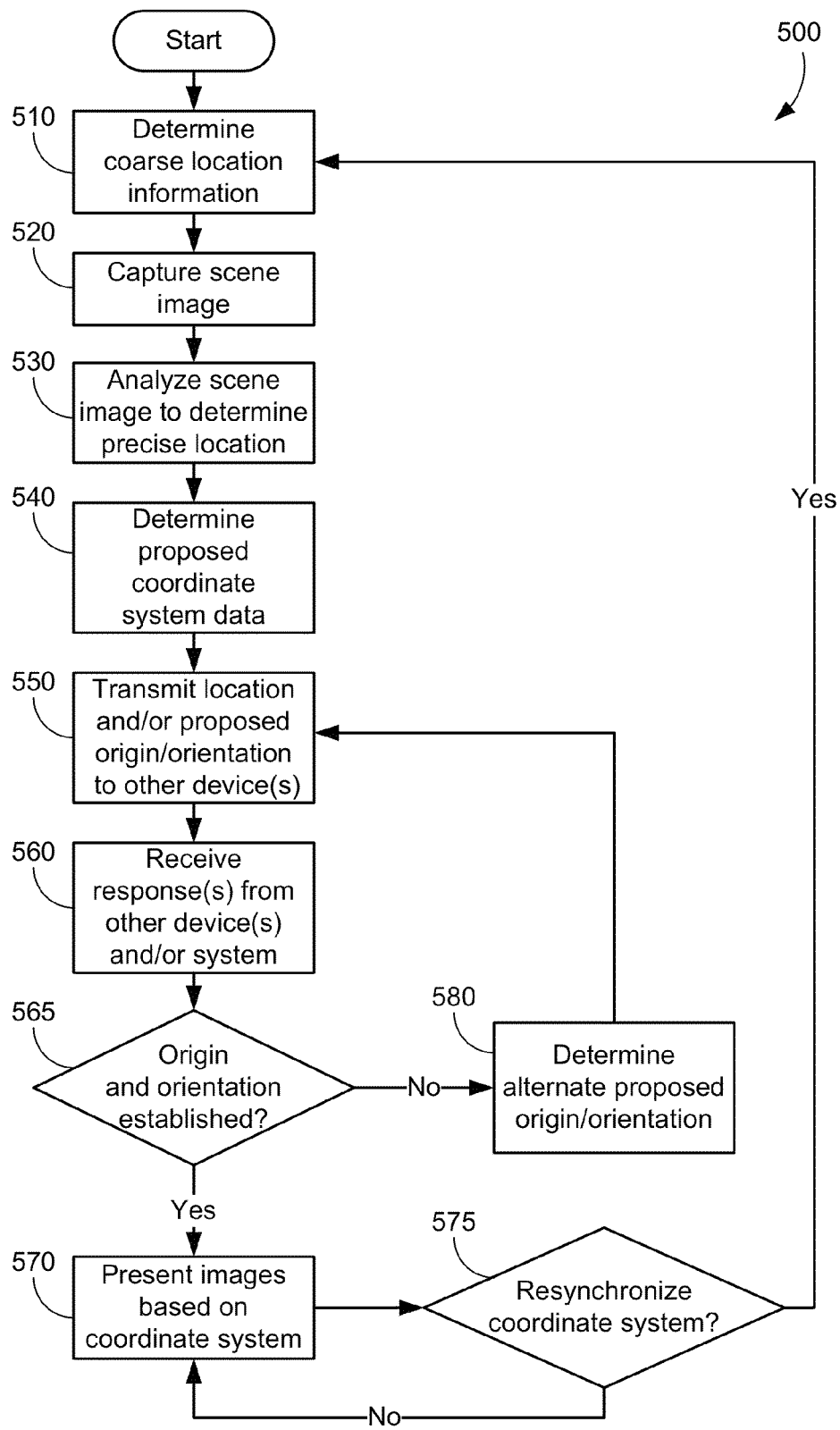
FIG. 5 is another non-limiting exemplary diagram of a method of unifying coordinate systems in an augmented reality application or system.

FIG. 5 illustrates an alternate non-limiting exemplary method 500 of implementing unification of coordinate systems in a device that interacts with an augmented reality application or system. At block 510, the device determines coarse location information. As with method 400, this may be any location information that may be used to analyze an image or other detected data to determine a precise location such as GPS or triangulation data, network derived data, or user supplied data. Any methods or means of determining a coarse location for a device are contemplated as within the scope of the present disclosure.

At block 520, one or more scene images are captured. Any image or images of a scene or any collection of data from a scene, area, space, or other physical environment may be captured. In one embodiment, a user may operate a device equipped with a camera or other detector to capture an image that may contain one or more known landmarks or features. Such features or landmarks that may be used for precise location determination may be composed of many detectable but relatively small and distinctively textured portions of various objects scattered throughout a detected scene. For example, in an image captured on a street in New York City, example landmarks that may be extracted include the letter 'G' taken from a street sign, the door handle of a building, and/or a crack in the sidewalk. The relative motions of these landmarks in response to camera movement may be measured and analyzed to provide the precise position of a device In another embodiment, the user may operate the device to capture an image of a particular landmark. For example, after determining at block 510 that a device is in a particular area (for example, New York City), the user may operate the device to capture an image of a particular landmark (for example, the Empire State Building.) Alternatively, a user may operate a device to capture an image of a tag or other feature that is designed specifically to facilitate determining location information. Such a tag may emit a form of radiation specially detectable by a properly configured device, or may be a specific shape, size, design, pattern, and/or color that is recognized by augmented reality software or associated software for the purposes of determining locations.

As with method 400, image capture may be performed at the request of an augmented reality system or application, or other software working in conjunction with such a system. Captured scene images may be two-dimensional or three-dimensional, and may be obtained using a single detector or camera or multiple detectors or cameras. All types of images and all methods and means of capturing images and/or requesting image capture are contemplated as within the scope of the present disclosure.

At block 530, the captured scene image is analyzed to determine a precise location. In some embodiments, portions or subsections of one or more captured images may be analyzed, such as groups of pixels or data representing groups of pixels, while in other embodiments, entire images may be analyzed. Any type of analysis may be employed that can facilitate determining a location, including the image analysis methods and means described herein in regard to other figures and any other image analysis methods and means. In many embodiments, several features, landmarks, or other elements of a scene may be analyzed and compared to known mapping information and/or element templates, while in other embodiments, a single element may be analyzed. All such methods and means are contemplated as within the scope of the present disclosure.

Once a precise location is determined, then at block 540, the user device may determine a proposed origin and/or orientation for a common coordinate system. The proposed origin may be based on the determined precise location, for example it may be the determined precise location of the device, or it may be the location of an identified element, such as a landmark or feature in the physical environment of which one or more scene images were captured. Alternatively, the proposed origin may be based on a previous mapping of an area. In some embodiments, where the physical locations of the users are separated, multiple sets of application-specific coordinate system origins and orientations may be used to determine a proposed common coordinate system. Various spaces may be identified that lend themselves to various types of usage, and origins and orientations may be based on such spaces. For example, if a user has a map of the user's entire house, one set of origins and orientations may identify ideal locations on the floors of the living room and den for a real-time application, while the center of the dining room table may be identified as an ideal location for a board game, the desk of the office may be identified as an ideal location for a virtual video teleconferencing application, and so forth.

In another alternative, the proposed origin may be chosen from a predetermined set of origins based upon location. For example, if the coarse location is an area within a major city, the augmented reality system or application may maintain a list of preferred origins for that area or city. The user device may then select the preferred origin closest to it as the proposed origin. Preferred orientations may also accompany such a list and be defined for each origin. Any other methods or means of determining a proposed origin are contemplated as within the scope of the present disclosure.

In one embodiment, a user device may be the device designated by an augmented reality system or application to determine an origin and orientation for a unified coordinate system. In this embodiment, once the designated user device determines the origin and orientation, it may transmit this data to other user devices and/or the augmented reality system or application, and the other devices may begin to use the coordinate system determined by the designated user device.

At block 550, the proposed origin and orientation, the origin and orientation as determined by a designated user device, information enabling user devices to transform their local coordinate system into a unified coordinate system, or information enabling translation between local and unified coordinate system data, are transmitted to other user devices and/or an augmented reality system or application. Additional information may also be transmitted, such as cartography information about the physical environment or information on the specific mapping data that matched elements in one or more scene images. Other information may be transmitted, such as data notifying a user device that its local coordinate system is unified with all other coordinate systems at a specific local position and orientation. This may be accomplished using any communications means, including wired communications means and wireless communications directly between devices or over a wireless communications network.

At block 560, one or more responses are received from other devices and/or an augmented reality system or application. These responses may take any form and may be received through any communications means. The response(s) may indicate that one or more other user devices accept with the proposed origin and orientation or that one or more other user devices reject the proposed origin and orientation. Alternatively, the response(s) may contain counterproposals for origin and orientation, including sets of application-specific coordinate system origins and orientations. In another alternative, the response(s) may contain a precise location of another user device, in one embodiment accompanied by a rejection of a proposed origin and orientation. In yet another alternative, the response may contain any data or other information that may be used to negotiate or otherwise determine an origin and orientation for a coordinate system for use in an augmented reality system or application. In still another alternative, the response may include proposed transform information that will enable a user device to transform its local coordinate system to the unified coordinate system or translate between local and unified coordinate system data.

At block 565, a determination is made as to whether an origin and orientation have been established for a unified coordinate system or whether sufficient data has been received to perform transformations for a local coordinate system. If so, then at block 570, images are presented to a user based on the unified coordinate system or using coordinate system transformation data. As with method 400, the images may be generated by the user device and manipulated so that they have a correct appearance and orientation relative to the image's and the user's location in the coordinate system, or received from an augmented reality system or application and presented to a user, with or without further modification. Any other manipulation or modification of an image or images based upon the location of the image, the element represented by the image, and/or the user in a coordinate system is contemplated as within the scope of the present disclosure. Information may also be sent from a user device to other devices regarding location data for objects detectable to the sending user device. For example, if an object within the field of detection of a first user device is of interest to a second user device, the first user device may transmit coordinates, transformation matrices, or other location data about the object of interest to the second user device. Any other location information of any object may be transmitted by one device to another, and all such embodiments are contemplated as within the scope of the present disclosure.

If at block 565 it is determined that an origin and orientation have not been established for a unified coordinate system or sufficient data has not been received to perform transformations for a local coordinate system, at block 580 an alternate proposed origin and orientation or transformation data may be determined. In one embodiment, responses received at block 560 may indicate locations of other user devices, and at block 580, the user device may determine an origin that is relatively equidistant from each user device location. In some embodiments, responses may contain other information that may used to determine or communicate positions and orientations of other user devices, such as tracking data based on a unified map or interconnected sub-maps, and/or data relating to known and unique features, landmarks, or elements with associated location data that may be used to derive position and orientation information.

Alternatively, if responses received at block 560 indicate locations of other user devices and the augmented reality system or application has a list of preferred origins and orientations, the user device may select an origin from the list that is relatively equidistant from each user device location. In yet another alternative, where responses received at block 560 include proposed origins and orientations from other user devices, the user device may select a proposed origin and orientation from the received proposed origins and orientations, effectively agreeing to another user device's proposed origin and orientation. In still another embodiment, where one or more of the responses received at block 560 is a response from an augmented reality system or application that indicates a preferred origin and orientation and/or transformation data, the user device may select the preferred origin and orientation, effectively agreeing to augmented reality system's proposed origin and orientation. Any other method or means of determining an alternate origin and orientation may be used, and all such methods and means are contemplated as embodiments of the present disclosure.

After an alternate proposed origin and orientation are determined or alternate proposed transformation data are determined, the method returns to block 550 where the proposed origin and orientation may be transmitted to other user devices and/or an augmented reality system or application. The process of proposing origins and orientations may repeat for multiple cycles until an origin and orientation are agreed upon by all devices interacting with the augmented reality system or application. Any other form of negotiation or handshaking processes that may be utilized to come to an agreement on a common origin and orientation is contemplated as within the scope of the present disclosure.

After a unified coordinate system is determined, and images are presented to a user based on the coordinate system, a decision may be made as to whether a resynchronization of the determined coordinate system is needed at block 575. As with method 400, user devices and/or an augmented reality system or application may be configured to periodically perform the some or all of the actions described in method 500 in order to maintain a synchronized coordinate system among user devices, or may be configured to perform the actions of method 500 after detecting a trigger or other event. In some embodiments, determining coarse and precise location information may not be required to resynchronize a coordinate system. A determination regarding whether or not resynchronization is to be performed may be made at any time, and may not be made each time an image is presented. Instead, such a determination may be made only on detection of a trigger or at periodic intervals. Any method or means of initiating or participating in a resynchronization of a coordinate system is contemplated. If resynchronization is to be performed, the method returns to block 510. Alternatively, the method may return to a different block if the determinations made in other blocks are not needed to resynchronize the coordinate system. If no resynchronization is to be performed, the method returns to block 570 to further present images to a user.

Figure 6:
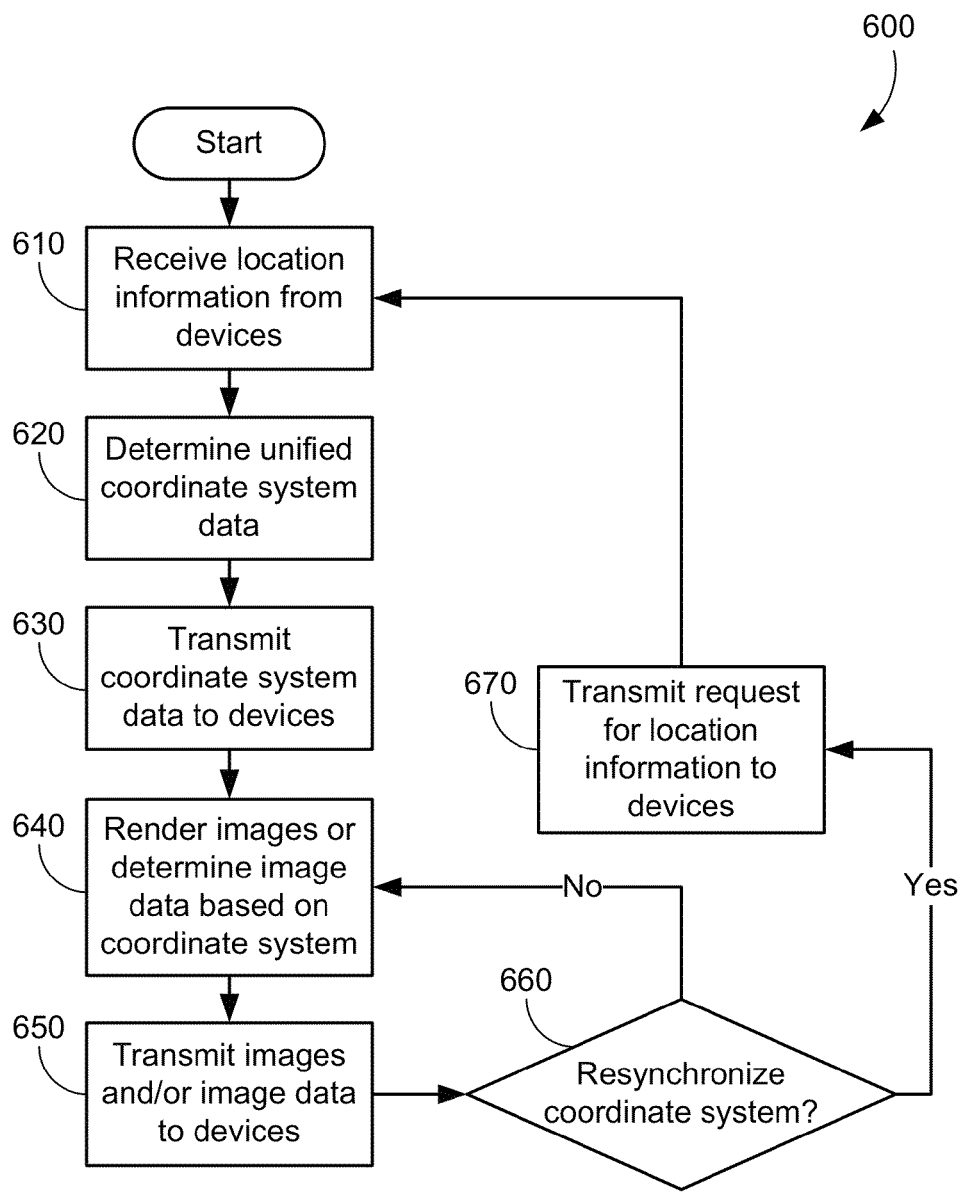
FIG. 6 is another non-limiting exemplary diagram of a method of unifying coordinate systems in an augmented reality application or system.

FIG. 6 illustrates an alternate non-limiting exemplary method 600 of implementing unification of coordinate systems in an augmented reality application or system. At block 610, an augmented reality system or application receives location information from user devices or other devices interacting with the augmented reality system or application. This may be precise location information or coarse location information as determined by any of the means or methods described herein, additional mapping or location information, and/or location information of any other type determined or derived in any other manner, all of which are contemplated as embodiments of the present disclosure.

At block 620, the augmented reality system or application may determine an origin and orientation for the common coordinate system, as well as additional data such as transformation data for user devices that allows a user device to transform a local coordinate system into a unified coordinate system or translate between local and unified coordinate system data. In one embodiment, the device locations received at block 610 are analyzed and an origin that is relatively equidistant to each device location is selected. In another embodiment, specific transformation data, such as transformation matrices, are determined for one or more user devices. In yet another embodiment, a specific origin may be selected from a predetermined list of preferred positions/orientations. The selected preferred origin may be the preferred origin that is the most equidistant to each of the device locations. Any other method or means may be used by the augmented reality system or application to determine an origin and orientation for a common coordinate system for use by a device interacting with the augmented reality system or application, and all such methods and means are contemplated as within the scope of the present disclosure.

At block 630, the origin and orientation, transformation data, any other data that may indicate or otherwise set the parameters of a unified coordinate system, and/or any location information or transformation data about objects within a coordinate system may be transmitted to user devices from the augmented reality system or application. This transmission may be performed using any communications means, including wired communications means and wireless communications directly between the augmented reality system or application and user devices or over a wireless communications network.

At block 640, the augmented reality system or application may render images or determine image data based on the common coordinate system. In one embodiment, images that are to be presented to a user may be generated by the augmented reality system or application and transmitted to user devices for display. The augmented reality system or application may manipulate images so that they have a correct appearance and orientation relative to the location of the element represented by the image and the user's location in the coordinate system. Alternatively, the images may be rendered identically for each user device, and any manipulation of the images may be performed on the user device. Alternatively, at block 640 the augmented reality system or application may determine image data without rendering or generating images. For example, the augmented reality system or application may determine that an element represented by an image may be at a particular location and orientation in the common coordinate system and transmit that data to a user device, having the user device perform any image rendering, generation, and/or manipulation. Any other manipulation or modification of an image or images, or data related to elements that may be represented by an image or images, based upon the location of an image, an element represented by the image, and/or a user in a coordinate system is contemplated as within the scope of the present disclosure.

At block 650 images and/or image data are transmitted to user devices from the augmented reality system or application. Here again, this transmission may be accomplished using any communications means, including wired and wireless communications.

At block 660, a decision may be made as to whether a resynchronization of the determined coordinate system is needed or desired. Like the other methods described herein, user devices and/or an augmented reality system or application may be configured to periodically perform the actions described in method 600 in order to maintain a synchronized coordinate system among user devices and the augmented reality system or application. Alternatively, user devices and/or the augmented reality system or application may be configured to perform the actions of method 600 after detecting a trigger or other event. Any method or means of initiating or participating in a resynchronization of a coordinate system is contemplated. If resynchronization is to be performed, at block 670 a request for location information is transmitted to user devices from the augmented reality system or application. This request may be transmitted using any communications means, including wired and wireless communications. The method then returns to block 610. Alternatively, the method may return to a different block if the determinations made in other blocks are not needed to resynchronize the coordinate system. If no resynchronization is to be performed, the method returns to block 640 to further render images or determine image data for user devices.

The methods and systems described herein may be implemented on one or more devices, components, or systems that are currently available or may be developed, and may be implemented in combination with software configured on such devices, components or systems. Such devices, components, systems, and software may be designed or configured to implement parts of or a complete augmented reality system or application, and/or may be used for additional tasks or functions as well as implementing parts of or a complete augmented reality system or application. Non-limiting exemplary devices, components, and systems that may be used in implementing an augmented reality system or application, in whole or in part, are described in further detail below.

Exemplary Networked and Distributed Environments

One of ordinary skill in the art can appreciate that a computer or gaming console, or other client or server device, including handheld communications devices, mobile telephones, personal data assistants (PDAs), augmented reality user devices, or any other device with computing and communications capabilities, can be deployed as part of a computer network, or in a distributed computing environment. In this regard, the present disclosure pertains to any augmented reality system or application, computer system, or virtual or augmented reality environment system as described herein, having any number of memory or storage units, and any number of applications and processes occurring across any number of storage units or volumes, which may be used in connection with an augmented reality system or application. The present disclosure may apply to an environment with server computers and client computers deployed in a network environment or distributed computing environment having remote or local storage. The present disclosure may also be applied to standalone computing devices, having programming language functionality, interpretation and execution capabilities for generating, receiving and transmitting information in connection with one or more augmented reality systems or applications.

Distributed computing facilitates may share computer resources and services by direct exchange between computing devices and systems, such as transmission of determined coarse or precise location data between augmented reality user devices and/or an augmented reality system or application. These resources and services include the exchange of information, cache storage, and disk storage for files. Distributed computing takes advantage of network connectivity, allowing clients to leverage their collective power to create and participate in sophisticated virtual and augmented reality environments. In this regard, a variety of devices may have applications, objects or resources that may implicate an augmented reality system or application that may utilize the techniques of the present subject matter.

Figure 7:
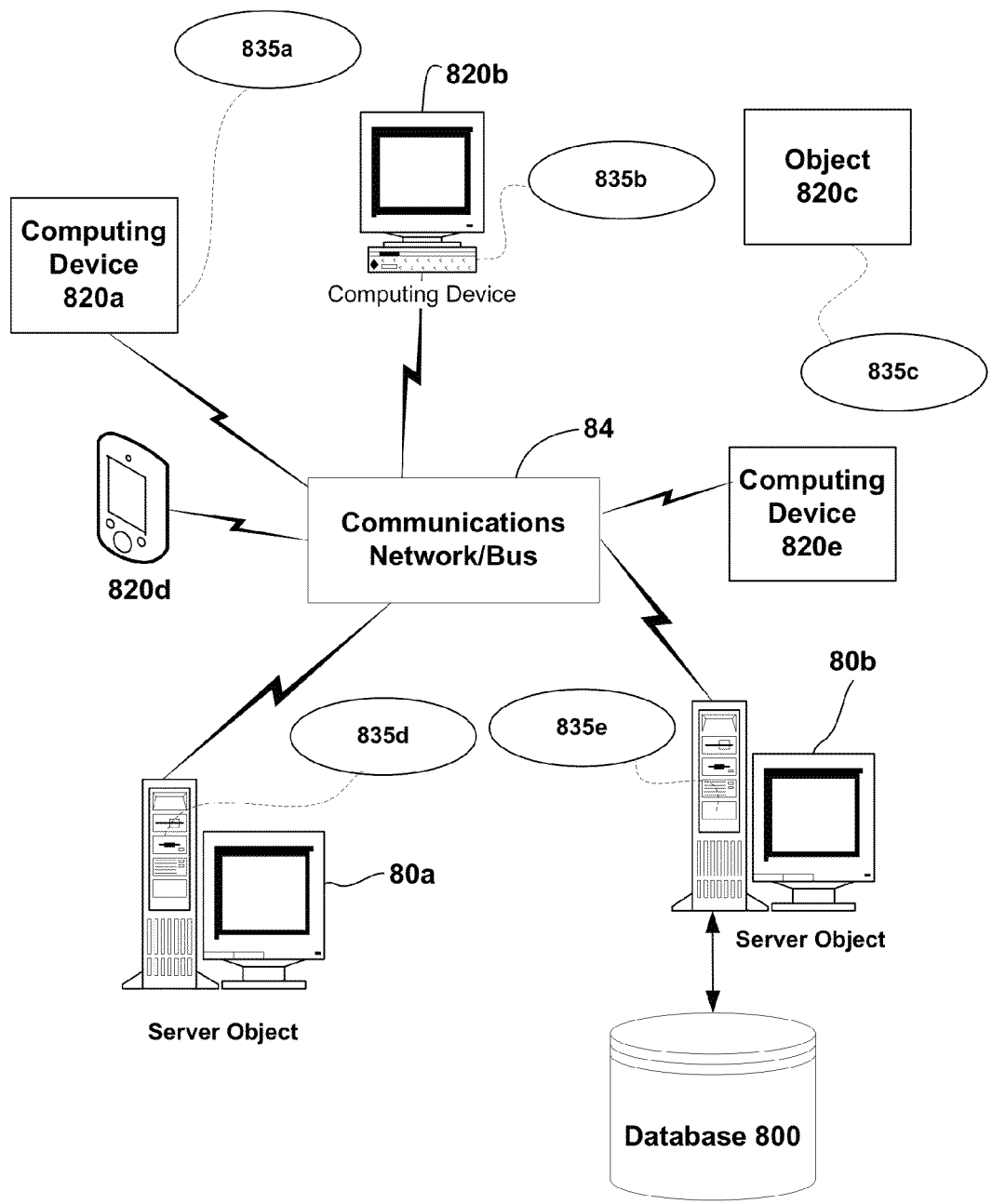
FIG. 7 is a block diagram representing an exemplary network environment having a variety of computing devices in which the present disclosure or parts thereof may be implemented.

FIG. 7 provides a schematic diagram of an exemplary networked or distributed system in which one or more augmented reality systems or applications may be implemented, in some embodiments as part of a virtual or augmented reality environment system. The distributed system comprises server computing objects 80a, 80b, etc. and computing objects or devices 820a, 820b, 820c, etc. These objects may be personal computers, gaming consoles, portable devices, mobile communications devices, digital or analog cameras, other forms of detectors, augmented reality servers or user devices, or any other computing device or combination of computing devices. These objects may comprise programs, methods, data stores, programmable logic, etc. The objects may comprise portions of the same or different devices such as personal digital assistants (PDAs), televisions, Moving Picture Experts Group (MPEG-1) Audio Layer-3 (MP3) players, televisions, gaming consoles, gaming devices, virtual or augmented reality devices, personal computers, etc. Each object may be configured to communicate with another object by way of the communications network 84. This network may itself comprise other computing objects and computing devices that provide services to the system of FIG. 7. This network may include wired and/or wireless components. In accordance with an aspect of the present disclosure, each object 80a, 80b, etc. or 820a, 820b, 820c, etc. may contain an application that might function as a component or element of an augmented reality system or application.

In a distributed computing architecture, computers, which may have traditionally been used solely as clients, may communicate directly among themselves and may act as both clients and servers, assuming whatever role is most efficient for the network or the virtual or augmented reality system or application. This reduces the load on servers and allows all of the clients to access resources available on other clients, thereby increasing the capability and efficiency of the entire network. A virtual or augmented reality system or application in accordance with the present disclosure may thus be distributed among servers and clients, acting in a way that is efficient for the entire system or application.

Distributed computing can help users of augmented reality systems or applications interact and participate in a virtual or augmented reality environment across diverse geographic boundaries. Moreover, distributed computing can move data closer to the point where data is consumed acting as a network caching mechanism. Distributed computing also allows computing networks to dynamically work together using intelligent agents. Agents reside on peer computers and communicate various kinds of information back and forth. Agents may also initiate tasks on behalf of other peer systems. For instance, intelligent agents can be used to prioritize tasks on a network, change traffic flow, search for files locally, or determine anomalous behavior such as a virus and stop it before it affects the network. Various other services are contemplated as well. Since an augmented reality system or application, or components of such a system or application, may in practice be physically located in one or more locations, the ability to distribute information and data associated with an augmented reality system or application is of great utility in such a system.

It can also be appreciated that an object, such as 820c, may be hosted on another computing device 80a, 80b, etc. or 820a, 820b, etc. Thus, although the physical environment depicted may show the connected devices as computers, such illustration is merely exemplary and the physical environment may alternatively be depicted or described comprising various digital devices such as gaming consoles, PDAs, televisions, mobile telephones, cameras, detectors, etc., software objects such as interfaces, COM objects and the like.

There are a variety of systems, components, and network configurations that may support an augmented reality system or application. For example, computing systems, communications systems, and detectors or cameras may be connected together by wired or wireless systems, by local networks, or by widely distributed networks. Currently, many networks are coupled to the Internet, which provides the infrastructure for widely distributed computing and encompasses many different networks.

The Internet commonly refers to the collection of networks and gateways that utilize the Transport Control Protocol/Interface Program (TCP/IP) suite of protocols, which are well-known in the art of computer networking. The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 7, computers 820a, 820b, etc. can be thought of as clients and computers 80a, 80b, etc. can be thought of as the server where server 80a, 80b, etc. maintains the data that is then replicated in the client computers 820a, 820b, etc.

A server is typically a remote computer system accessible over a local network such as a LAN or a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a URL address. For example, communication can be provided over a communications medium. In particular, the client and server may be coupled to one another via TCP/IP connections for high-capacity communication.

Thus, FIG. 7 illustrates an exemplary networked or distributed environment, with a server in communication with client computers via a network/bus, in which an augmented reality system or application may be implemented. In more detail, a number of servers 80a, 80b, etc., are interconnected via a communications network/bus 84, which may be a LAN, WAN, wireless communications network, intranet, the Internet, etc., with a number of client or remote computing devices 820a, 820b, 820c, 820d, 820e, etc., such as a portable computer, handheld computer, PDA, thin client, networked appliance, mobile telephone, personal computer, gaming console, camera, detector, or other device, in accordance with the present disclosure. It is thus contemplated that the present disclosure may apply to any computing device that may communicate, interact, and/or operate in or with an augmented reality system or application.

In a network environment in which the communications network/bus 84 is the Internet, for example, the servers 80a, 50b, etc. can be web servers with which the clients 820a, 820b, 820c, 820d, 820e, etc. communicate via any of a number of known protocols such as HTTP. Servers 80a, 80b, etc. may also serve as clients 820a, 820b, 820c, 820d, 820e, etc., as may be characteristic of a distributed virtual environment or an augmented reality system or application. Communications may be wired or wireless, where appropriate. Client devices 820a, 820b, 820c, 820d, 820e, etc. may or may not communicate via communications network/bus 84, and may have independent communications associated therewith. Each client computer 820a, 820b, 820c, 820d, 820e, etc. and server computer 80a, 80b, etc. may be equipped with various application program modules or objects 835 and with connections or access to various types of storage elements or objects, across which files, images, frames, location data, or any other type of data may be stored or to which portion(s) of files, images, or frames may be downloaded or migrated. Any computers 80a, 80b, 820a, 820b, 820c, 820d, 820e, etc. may be responsible for the maintenance and updating of database 800 or other storage element in accordance with the present subject matter, such as a database or memory 800 for storing location data and images, such as captured, augmented, and/or modified files, images, and/or frames. Database 800 and one or more of computers 80a, 80b, 820a, 820b, 820c, 820d, 820e, etc, may form elements of an augmented reality system or application as described herein and may interact with other components or elements of an augmented reality system or application according to the present disclosure. Thus, the present disclosure can be utilized in a computer network environment having client computers 820a, 820b, 820c, 820d, 820e, etc. that can access and interact with a computer network/bus 84 and server computers 80a, 80b, etc. that may interact with client computers 820a, 820b, 820c, 820d, 820e, etc. and other like devices, and databases 800.

Exemplary Computing Environment

Figure 8:
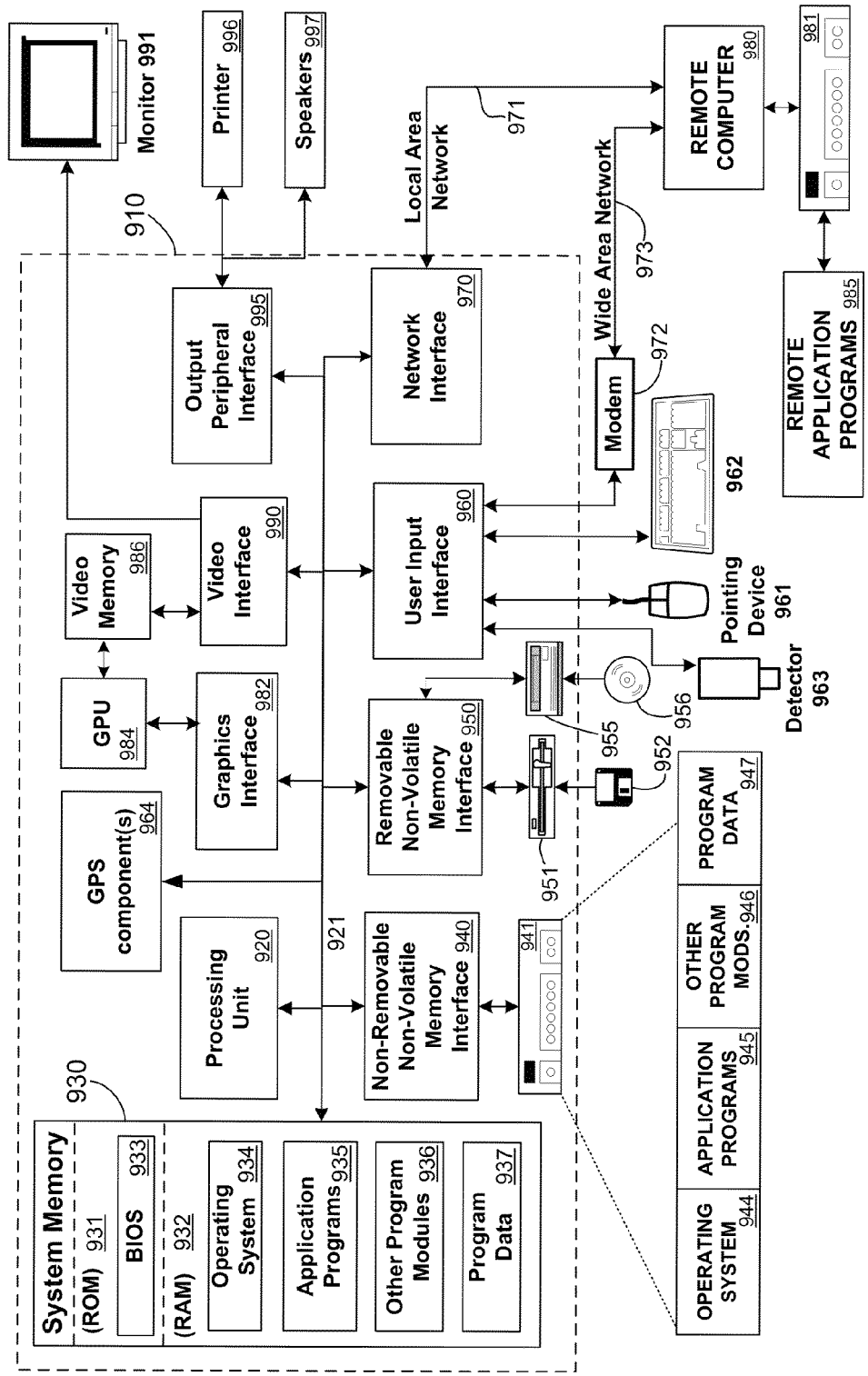
FIG. 8 is a block diagram representing an exemplary non-limiting computing device in which the present disclosure or parts thereof may be implemented.

FIG. 8 and the following discussion are intended to provide a brief general description of a suitable computing environment in which the present disclosure or parts thereof may be implemented. It should be understood, however, that handheld, portable, and other computing devices and computing objects of all kinds are contemplated for use in connection with the present disclosure, as described above. Thus, while a general purpose computer is described below, this is but one example, and the present disclosure may be implemented with other computing devices, such as a thin client having network/bus interoperability and interaction. The present disclosure may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that an augmented reality system or application may be employed is a desirable, or suitable, environment for the augmented reality systems and applications of the disclosure.

Although not required, the present disclosure can be implemented via an operating system, for use by a developer of services for a device or object, and/or included within application software that operates in connection with an augmented reality system or application. Software may be described in the general context of computer-executable instructions, such as program modules, being executed by one or more computers, such as client workstations, servers, gaming consoles, mobile devices, or other devices. Generally, program modules include routines, programs, objects, components, data structures and the like that perform particular tasks or implement particular abstract data types. The functionality of the program modules may be combined or distributed as desired in various embodiments. Moreover, those skilled in the art will appreciate that the present disclosure may be practiced with other computer system configurations. Other well known computing systems, environments, and/or configurations that may be suitable for use with the present subject matter include, but are not limited to, personal computers (PCs), gaming consoles, automated teller machines, server computers, hand-held or laptop devices, multi-processor systems, microprocessor-based systems, programmable consumer electronics, network PCs, appliances, environmental control elements, minicomputers, mainframe computers, digital cameras, wireless telephones, dedicated augmented reality user devices and servers, and the like. The disclosure may also be practiced in distributed computing environments where tasks are performed by remote processing devices that are linked through a communications network/bus or other data transmission medium, as described herein in regard to FIG. 7. In a distributed computing environment, program modules may be located in both local and remote computer storage media including memory storage devices, and client nodes may in turn behave as server nodes.

FIG. 8 thus illustrates an example of a suitable computing system environment 900 in which the present subject matter or parts thereof may be implemented, although as made clear above, computing system environment 900 is only one example of a suitable computing environment and is not intended to suggest any limitation as to the scope of use or functionality of the disclosure. Devices functioning as components or parts of an augmented reality system or application may be implemented using a system such as computing system environment 900, but those skilled in the art will recognize that there are other appropriate systems in which to implement the present disclosure. Computing system environment 900 should not be interpreted as having any dependency or requirement relating to any one or combination of components illustrated in the exemplary operating environment 900.

With reference to FIG. 8, an exemplary system for implementing the disclosure includes a general purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus.)

Computer 910 typically includes a variety of computer-readable media. Computer-readable media can be any available media that can be accessed by computer 910 and includes both volatile and nonvolatile media and removable and non-removable media. By way of example, and not limitation, computer-readable media may comprise computer storage media and communication media. Computer storage media includes both volatile and nonvolatile and removable and non-removable media implemented in any method or technology for storage of information such as computer-readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), digital versatile disks (DVD) or other optical disk storage, magnetic cassettes, magnetic tape, magnetic disk storage or other magnetic storage devices, or any other medium that can be used to store the desired information and that can accessed by computer 910. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

System memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 8 illustrates operating system 934, application programs 935, other program modules 936, and program data 937.

Computer 910 may also include other removable/non-removable, volatile/nonvolatile computer storage media. By way of example only, FIG. 8 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 941 is typically connected to the system bus 921 through an non-removable memory interface such as interface 940, and magnetic disk drive 951 and optical disk drive 955 are typically connected to system bus 921 by a removable memory interface, such as interface 950.

The drives and their associated computer storage media discussed above and illustrated in FIG. 8 provide storage of computer-readable instructions, data structures, program modules and other data for computer 910. In FIG. 8, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into computer 910 through input devices such as a keyboard 962 and pointing device 961, commonly referred to as a mouse, trackball or touch pad. Alternatively, pointing device 961 may be a controller used with a gaming console. Detector 963 may communicate with computer 910 through interface 960 to provide images, video frames, and/or other detected information or data to computer 910. Detector 963 may be a camera of any type, or any other type of detection device. Other input devices (not shown) may include a microphone, joystick, game pad, satellite dish, scanner, or the like.

These and other input devices are often connected to processing unit 920 through a user input interface 960 that is coupled to system bus 921, but may be connected by other interface and bus structures, such as a parallel port, game port or a universal serial bus (USB). A graphics interface 982 may also be connected to system bus 921. One or more graphics processing units (GPUs) 984 may communicate with graphics interface 982. In this regard, GPUs 984 generally include on-chip memory storage, such as register storage and GPUs 984 communicate with a video memory 986. GPUs 984, however, are but one example of a coprocessor and thus a variety of coprocessing devices may be included in computer 910. A monitor 991 or other type of display device may also connect to system bus 921 via an interface, such as a video interface 990, which may in turn communicate with video memory 986. Monitor 991 may be specially configured to render stereoscopic images, or it may be a standard monitor. It is further contemplated that computer 910 may have multiple monitors configured. For example, computer 910 may be configured with a head set, head gear, or eye glasses that have individual monitors for each eye. In addition to monitor 991, computers may also include other peripheral output devices such as speakers 997 and printer 996, which may be connected through an output peripheral interface 995.

Computer 910 may operate in a networked or distributed environment using logical connections to one or more remote computers, such as a remote computer 980. Remote computer 980 may be a personal computer, a server, a router, a network PC, a peer device or other common network node, and typically includes many or all of the elements described above relative to computer 910, although only a memory storage device 981 has been illustrated in FIG. 8. The logical connections depicted in FIG. 8 include a local area network (LAN) 971 and a wide area network (WAN) 973, but may also include other networks/buses, including all types of wired and wireless networks, and combinations thereof. Such networking environments are commonplace in homes, offices, enterprise-wide computer networks, intranets and the Internet.

When used in a LAN networking environment, computer 910 may be connected to LAN 971 through a network interface or adapter 970. When used in a WAN networking environment, computer 910 typically includes a modem 972 or other means for establishing communications over WAN 973, such as the Internet. Modem 972, which may be internal or external, may be connected to system bus 921 via user input interface 960, or other appropriate mechanism. In a networked environment, program modules depicted relative to computer 910, or portions thereof, may be stored in the remote memory storage device. By way of example, and not limitation, FIG. 8 illustrates remote application programs 985 as residing on memory device 981. It will be appreciated that the network connections shown are exemplary and other means of establishing a communications link between the computers, including all wired and wireless means, may be used.

Computer 910 may include, or be communicatively connected to, GPS component(s) 964. GPS component(s) 964 may be one or more components that communicate with a global positioning system to determine or obtain location information for a computer 910, or communicate with other devices or components in order to obtain or determine location information.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   capturing on a first device a first scene image;
   identifying on the first device a landmark shown in the first scene image;
   determining on the first device a precise location of the first device based on the landmark;
   determining on the first device a precise location of the landmark;
   determining on the first device first coordinate system negotiation data comprising the precise location of the landmark as a proposed origin for a first coordinate system;
   transmitting the first coordinate system negotiation data and the precise location of the first device to a second device; and
   receiving a response from the second device comprising second coordinate system negotiation data comprising an acceptance of the first coordinate system negotiation data.

2. The method of claim 1, wherein the second coordinate system negotiation data comprises transformation data, the method further comprising: determining virtual element locations based on the transformation data, and presenting images comprising virtual elements on a display of the first device based on the virtual element locations.

3. The method of claim 1, further comprising determining on the first device an estimated location of the first device and determining a first set of cartography data based on the estimated location of the first device.

4. The method of claim 3, wherein identifying on the first device the landmark comprises selecting the landmark from a plurality of landmarks associated with the estimated location of the first device.

5. The method of claim 3, wherein transmitting the first coordinate system negotiation data and the precise location of the first device to the second device comprises transmitting identification data of the first set of cartography data to the second device.

6. The method of claim 1, wherein determining on the first device the precise location of the first device based on the landmark comprises determining that the landmark comprises a fiducial tag represented in a first set of cartography data.

7. The method of claim 1, further comprising generating cartography data based on the first scene image.

8. The method of claim 1, further comprising receiving cartography data from the second device.

9. A computer-readable storage medium comprising computer-readable instructions that when executed by a computing device cause the computing device to perform the instructions comprising:
receiving first location data from a first device comprising a precise location of a first landmark detected by the first device;
receiving second location data from a second device comprising a precise location of a second landmark detected by the second device;
selecting the precise location of the first landmark as a proposed origin and determining a first orientation based on the first location data and the second location data;
transmitting the proposed origin and the first orientation to the first device and the second device;
receiving a response from at least one of the first device and the second device;
responsive to receiving the response, selecting the precise location of the second landmark as the proposed origin and determining a second orientation based on the first location data and the second location data;
determining coordinate system data based on the proposed origin and the second orientation; and
transmitting the coordinate system data to the first device and the second device.

10. The computer-readable storage medium of claim 9, wherein determining coordinate system data based on the proposed origin and the second orientation comprises determining a first transformation matrix based on the first location data and the proposed origin and the second orientation and determining a second transformation matrix based on the second location data and the proposed origin and the second orientation.

11. The computer-readable storage medium of claim 9, further comprising:
receiving first cartography data for a first area from the first device;
receiving second cartography data for a second area from the second device;
determining congruence data for the first area and the second area based on the first cartography data and the second cartography data;
determining a first matrix transformation for the first device and a second matrix transformation for the second device based on the congruence data; and
transmitting the first matrix transformation to the first device and the second matrix transformation to the second device.

12. The computer-readable storage medium of claim 11, further comprising:
generating third cartography data for a third area, wherein the third area comprises the first area and the second area; and
transmitting the third cartography data to the first device and the second device.

13. The computer-readable storage medium of claim 9, further comprising:
detecting a resynchronization trigger;
transmitting a request for location data to the first device and the second device;
receiving updated first location data from the first device;
receiving updated second location data from the second device;
determining an updated origin based on the updated first location data and the updated second location data;
determining updated coordinate system data based on the updated origin; and
transmitting the updated coordinate system data to the first device and the second device.

14. The computer-readable storage medium of claim 9, wherein determining the coordinate system data based on the proposed origin and the second orientation comprises determining cartography data based on the first location data and the second location data, and wherein transmitting the coordinate system data to the first device and the second device comprises transmitting the cartography data to the first device and the second device.

15. A system comprising:
a detection component configured to capture a first scene image;
a processor configured to:
identify a landmark shown in the first scene image,
determine a precise position and orientation of the system based on the landmark,
and
determine a precise location of the landmark;
a transmitter configured to transmit the precise position and orientation of the system and the precise location of the landmark as a proposed origin for a first coordinate system to a remote device;
a receiver configured to receive, from the remote device, coordinate system data comprising an indication that the precise location of the landmark is an origin for the first coordinate system;
the processor further configured to generate a first presentation image based, at least in part, on the coordinate system data; and
a display configured to render the first presentation image.

16. The system of claim 15, wherein the coordinate system data comprises a transformation matrix.

17. The system of claim 16, wherein the processor is further configured to generate the first presentation image by determining a transformed precise position and orientation of the system using the transformation matrix, determining a virtual element location relative to the transformed precise position and orientation of the system, and rendering the first presentation image comprising a virtual element based on the virtual element location.

18. The system of claim 15, wherein the detection component is configured to capture a second scene image, and wherein the processor is further configured to generate the first presentation image by compositing the second scene image with an image of a virtual element.

19. The system of claim 15, wherein the processor is further configured to determine the precise position and orientation of the system based on the landmark comprises the processor configured to compare the landmark to at least one element template.

20. The system of claim 19, further comprising a position and orientation component configured to determine a coarse position and orientation of the system, wherein the transmitter is further configured to transmit a request for element template data comprising the coarse position and orientation of the system to the remote device, and wherein the receiver is further configured to receive the element template data from the remote device.

* * * * *